United States Patent Office 2,771,017
Patented Nov. 20, 1956

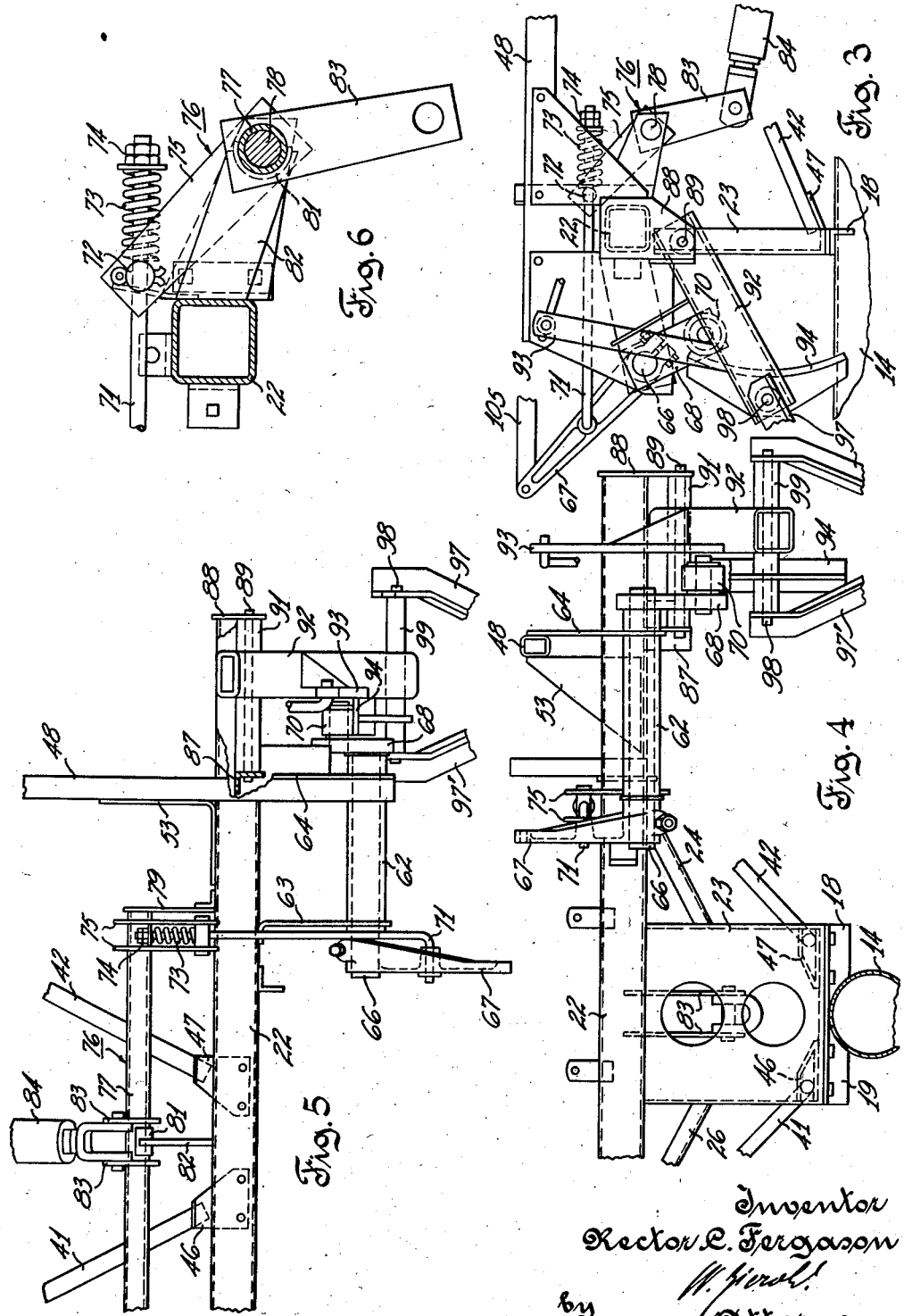

2,771,017

IMPLEMENT SUSPENSION FOR AGRICULTURAL MACHINES

Rector C. Fergason, Gadsden, Ala., assignor to Allis-Chalmers Manufacturing Company, Milwaukee, Wis.

Original application September 10, 1949, Serial No. 114,969. Divided and this application March 4, 1954, Serial No. 414,015

2 Claims. (Cl. 97—47.64)

This invention relates to agricultural machines and it is concerned more particularly with a suspension system for crop gathering and other implement units which require up and down adjustment relative to the ground. The present application is a division of U. S. Patent No. 2,671,298, March 9, 1954 for Cotton Picker.

In the construction and operation of cotton pickers, it is important that the picking unit or units be properly counterbalanced for any of its vertically adjusted picking positions. In the actual harvesting operation, it is the practice to adjust the units so that a ground engaging shoe or runner attached to the bottom of the units will ride along the ground. Should the ground engaging shoe encounter an obstruction such as a mound of earth, the weight of the unit would normally cause the unit to dig in an a destructive contact between the unit and harvester would result. It is desirable then to provide a mechanism which avoids this difficulty.

The common practice in suspending the picking units of cotton harvesters is to employ counterbalancing springs of a capacity to carry most of the weight of the units, thereby relieving the ground engaging shoe or runner of all but a small amount of weight. The primary reason for this type of mounting is to achieve a partial floating action in which a slight amount of pressure caused by an obstruction encountered by the ground shoe will cause the unit to float to a higher level and consequently avoid the obstruction. The principal difficulty with this practice is that as the unit is raised, the amount of weight carried by the counterbalancing spring becomes less and less due to the loss in tension as the spring relaxes. It is obvious then that at a higher adjusted operating level the floating action will decrease due to a decrease in spring tension, thereby throwing more weight on the ground shoe and of course increasing the possibility of the unit digging into a ground obstruction rather than riding over it. It is most desirable then to mount the unit so that this same floating action is maintained at all adjusted positions of the unit.

In addition, when suspending a pair of picking units, it is desirable to provide a suspension system which will not only serve to adjust both units up and down by means of a single lifting device, such as a hydraulic ram, but which will also be so constructed that both units may float and adjust themselves independently of each other so that an obstruction encountered by one unit on one side of the harvester will not necessitate an adjustment of the unit on the other side of the harvester.

Under normal operating conditions the unit will be constantly adjusting itself to the ground contour and in doing so will occasionally reach the limit of downward movement which is determined by the setting of the adjusting mechanism. In order to minimize shock when the unit reaches its lower limit position it is desirable to provide a resilient cushioning device in the suspension system to absorb this shock.

The relatively large size and heavy weight of some types of cotton picking units, for instance those of the rotary spindle type, impose severe requirements on the construction of the suspension system, particularly in the matter of preventing lateral swinging movement of the units. In addition to preventing this lateral movement it is also desirable to stabilize the unit against up and down tipping of its front and rear ends and to insure that in raising and lowering of the unit its front and rear ends move at the same or substantially the same rate of speed and in the same direction.

The principal object of this invention is to provide an improved suspension system which will satisfy the above outlined requirements in a simple and satisfactory manner.

Another object of this invention is to provide a suspension system in which the amount of force necessary to raise the unit is the same regardless of the adjusted position of the unit.

Another object of this invention is to provide a suspension system wherein a pair of units may be mounted to float independently of each other when encountering obstructions and which are raised and lowered by the action of a common lifting device.

Another object of this invention is to provide a suspension system of the outlined character which will be protected against undue shock loads, particularly those which may result from self-adjustment of the unit to its lower limit position, and also those which may result from the application of lifting power by means of the common lifting device.

A further object of this invention is to provide an implement suspension system of the outlined character in which lateral swinging of the implement unit or units is substantially eliminated, and in which raising and lowering of the unit or units may be effected without, or substantially without, change of angularity relative to the ground.

The foregoing and other objects and advantages are attained by the present invention, various novel features of which will be apparent from the description herein and the accompanying drawings, in which:

Fig. 3 is a side elevation, on an enlarged scale, of part of a picking unit suspension system incorporated in the harvester shown in Figs. 1 and 2;

Fig. 4 is a front view of the assembly of parts shown in Fig. 3;

Fig. 5 is a plan view of the assembly of parts shown in Figs. 3 and 4 with parts broken away and shown in section; and Fig. 6 is an enlarged detail view of some of the parts in Fig. 5.

Figure 1:
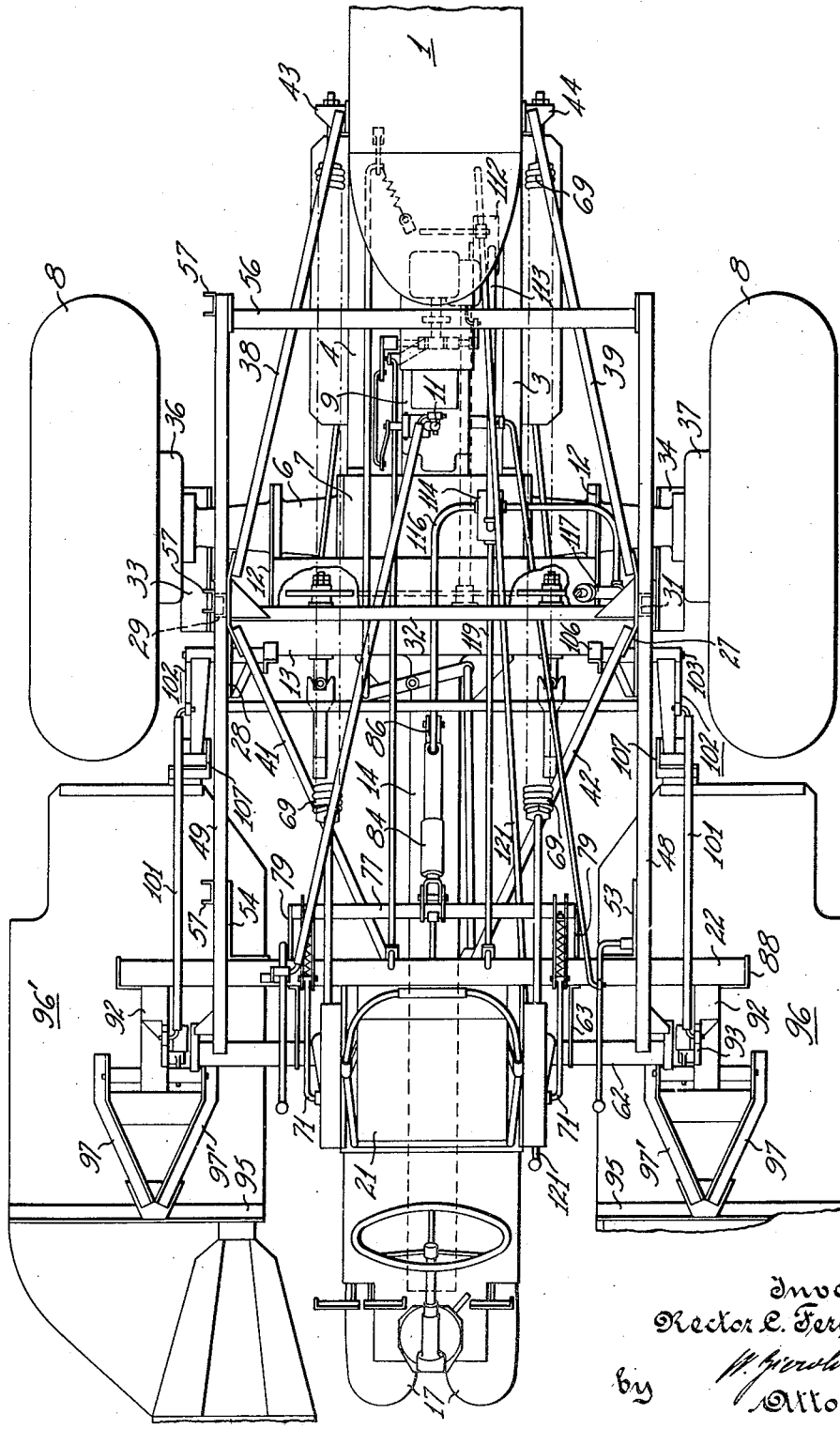
Fig. 1 is a fractional chassis view, in plan, of a self-propelled cotton harvester having a pair of laterally spaced picking units.
Figure 2:
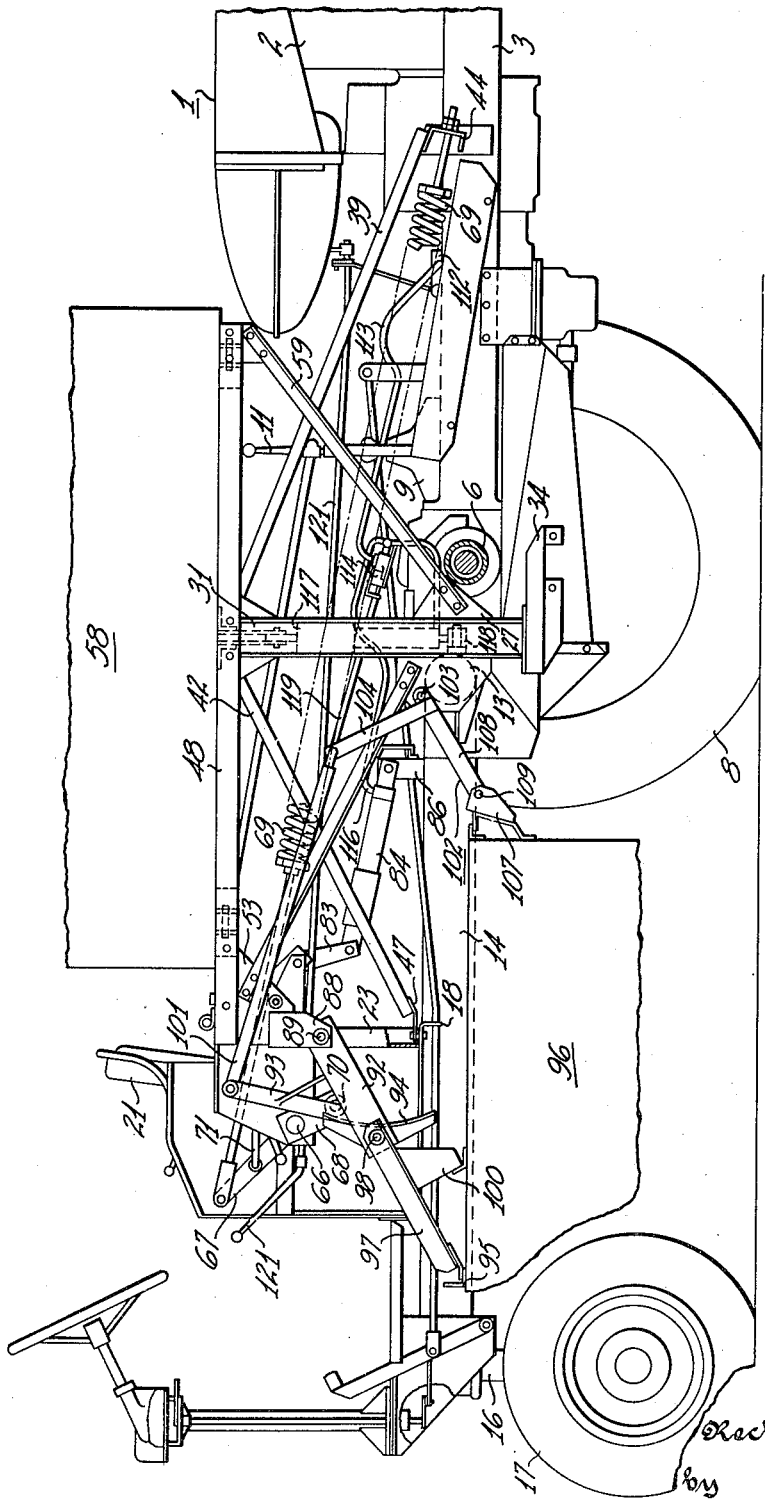
Fig. 2 is a fractional side elevation of the machine shown in Fig. 1.

Referring to Figs. 1 and 2, a tractor 1 has a rearwardly located engine 2 supported on frame members 3 and 4, respectively, which are joined at their forward ends to a transverse axle housing 6 and supported thereby as a cantilever beam. This axle housing is of the drop type and has a central or intermediate portion 7 enclosing a conventional differential drive, not shown. The axles of a pair of traction wheels 8 are driven by the differential mechanism and the latter is supplied with power from the engine 2 by a transmission shaft and change speed transmission (not shown) enclosed in a transmission housing 9. A transmission gear shift lever 11 (Fig. 2) is pivotally carried by transmission housing 9.

Removably connected to axle housing 6 by means of a pair of tie plates 12 (Fig. 1) is a T-shaped pipe frame having a transverse pipe portion 13 extending generally parallel in spaced relation to axle housing 6 and a longitudinally extending central frame portion 14 having the forward end thereof connected to a front steerable support 16 mounting a pair of ground engaging wheels 17. Longitudinal frame portion 14 has secured to it a pair of transversely extending angle irons 18 and 19 (Fig. 4) which serve as supports for an upright channel bracket 23 (Figs. 3 and 4). A transversely extending forward tubular frame member 22, square in cross section, is supported in spaced, elevated relation to central frame member 14 by the channel bracket 23 (Fig. 4) and by angle braces 24 and 26 connecting channel bracket 23 with transverse frame member 22. An operator's seat 21 (Figs. 1 and 2) is suitably mounted on the frame structure including the tubular frame member 22.

Connected to the opposite ends of the rearward transverse pipe portion 13 (Fig. 1), as by welding, are upwardly extending plate members 27 and 28 which are supportingly connected to upright channel members 29 and 31 (Figs. 1 and 2). The upper end of channel members 29 and 31 are joined by a cross member 32, and horizontal lower braces 33 and 34 are connected by bolting to the lower ends of channel members 29 and 31 and to axle housing depending side portions 36 and 37. Diagonal brace rods 38 and 41 at the right side of the machine, and diagonal brace rods 39 and 42 at the left side of the machine extend from the upper ends of channel members 29 and 31 to anchor clips 43 (Fig. 1), 46 (Fig. 4) at the right side of the machine, and to anchor clips 44 (Fig. 1) and 47 (Fig. 4) at the left side of the machine, the terms "right" and "left" being used in conformity with the orientation of an operator facing forwardly from seat 21.

A pair of horizontal, longitudinally extending basket support frame members 48 and 49 are supported at their approximate midportions by channel members 29 and 31. The forward portions of frame members 48 and 49 are supported on transverse tube 22 by triangular brace plates 53, 54 as shown in Figs. 1 and 4. The rear ends of frame members 48 and 49 are rigidly united by a basket supporting cross frame member 56. As shown in Fig. 2, a forwardly and downwardly extending brace rod 59 is secured at its upper end to the basket supporting cross frame member 56 in proximity to the rear end of frame member 48, and the forward end of rod 59 is secured to the tie plate 27. A similar brace rod, not shown, is secured to the cross frame member 56 in proximity to the rear end of frame member 49, and to the tie plate 28. Three channel shaped hinge brackets 57 (Fig. 1) are fixedly secured to longitudinally spaced portions of frame member 49, these hinge brackets pivotally receiving hinge blocks attached to the frame of a picked cotton receiving basket 58.

A suspension system for a pair of picking units 96, 96' at the left and right sides, respectively, of the machine is selectively operable to adjust the picking units in unison either up or down relative to the main frame of the machine which is supported on the rear traction wheels 8 and front steering wheels 17; the picking unit 96 as shown in Fig. 2 being adjusted to its lowest position. A transversely extending tube 62 (see Figs. 4 and 5) which forms part of the suspension system at the left side of the machine is rigidly supported by a forwardly extending bracket plate 63 carried by tube 22, and by another bracket plate 64 which rigidly unites the forward end of basket support frame member 48 with an intermediate portion of tube 22. Tube 62 rotatably supports an actuating rocker member comprising a rock shaft 66, a crank arm 67 fixedly mounted at one end of shaft 66, and a roller arm 68 (Fig. 3) fixedly mounted at the other end of rock shaft 66 and rotatably supporting a cam follower element in the form of a roller 70. A resilient biasing means in the form of a counterbalancing spring 69 (Figs. 1 and 2) has one end connected to the upper end of crank arm 67, and the other end of spring 69 is anchored on clip 44 which is secured to frame member 3 at the left side of the machine. A reciprocable link or power transmitting element 71 is part of a power transmitting means or lever structure and connects the crank arm 67 with the power transmitting means, to be presently described, the forward end of the link 71 being pivotally connected to a midportion of crank arm 67 (Fig. 3) and the rearward end of the link 71 extending slidably through a pin 72 rotatably mounted at the free ends of parallel lever arms 75 (Figs. 5 and 6). Withdrawal of link member 71 from pin 72 in a forward direction is prevented by a buffer element in the form of a coil spring 73 which surrounds the link 71 in interposed relation between pin 72 and a pair of nuts 74 on the threaded rearward end of link 71. The link 71 and pin 72 constitute a pair of relatively movable power transmitting elements with link 71 connected to the actuating rocker and pin 72 connected to the lifting device or ram 84 through the multiple armed lever structure 76. Compression spring or buffer element 73 bears against pin 72 and reacts upon link 71 to transmit power in implement raising direction to the actuating rocker.

Referring to Figs. 4 and 5, tube 22 also carries a short depending angle iron 87 and a depending end plate 88. A transverse shaft 89 which is rigidly secured at its opposite ends to the angle iron 87 and to end plate 88, respectively, pivotally mounts a sleeve 91 having a suspension link 92, tubular in form, rigidly attached thereto as by welding. As best shown in Fig. 3, a reach arm 93 and a cam shoe 94 are rigidly secured to suspension link member 92, with the cam element or shoe positioned to coact with cam roller 7. It will be noted that the cam shoe 94 is concave and has a cam surface which extends generally transverse to the length of link 92 in facing relation to the pivot center of the link member at 89.

Referring to Figs. 1 and 2, a hanger bracket for connecting the picking unit 96 to the free end of the suspension link 92 comprises a pair of upwardly and rearwardly inclined and forwardly converging bracket arms 97, 97' which are rigidly secured at their forward ends to a transversely extending top frame member 95 of the picker unit 96 approximately midway between the front and rear ends of the latter. The bracket arms 97, 97' are additionally connected with the picker unit 96 by a brace 100 which extends rearward and downward from rear portions of the bracket arms 97, 97'. A pivot shaft 98 is rigidly secured at its opposite ends to the rear ends of the bracket arms 97, 97'. The shaft 98 is rotatable within a sleeve 99 which is rigidly secured to the forward end of the suspension link 92 for establishing a pivotal load transmitting connection between the latter and the picker unit 96. The hanger bracket and link member 92 comprise part of the link system for mounting the picking units in guided vertical movable relation to the mobile support or tractor.

A mechanism similar to the one just described is provided to mount the cotton picking unit 96' on the right side of the machine opposite picking unit 96.

The parallel lever arms 75 which rotatably mount the pin 72 form part of a multiple armed lever structure 76 which, as shown in Figs. 1 and 5, serves to transmit lifting power from a hydraulic ram or fluid motor 84 to both picking units 96 and 96'. Referring particularly to Figs. 5 and 6, the parallel arms 75 are affixed to a transverse sleeve 77 which, in turn, is rotatably supported on a transversely extending stationary supporting shaft 78 fixedly attached at its opposite ends to brackets 79 (Figs. 1 and 5) carried by longitudinally spaced portions of tube 22. A half bushing support 81 is provided for a midportion of sleeve 77 by an additional bracket 82 carried by tube 22 as indicated in Fig. 5. The multiple armed lever structure 76 further comprises a pair of closely spaced fluid motor or hydraulic ram lever arms 83 which are attached to sleeve 77 on opposite sides of half bushing 81 and have their other ends pivotally attached to the plunger of a power means in the form of a ram 84 whose cylinder is pivotally attached to a bracket 86 (Figs. 1 and 2) carried by longitudinal pipe member 14.

The suspension link 92 together with its reach arm 93 (Fig. 2) are part of a parallel linkage which connects the picking unit 96 with its mobile support, that is with the wheeled frame structure of the machine, in guided, vertically movable relation thereto. The parallel linkage is part of the above mentioned link system and further includes a bell crank lever 102 at the rear end of the picking unit (Fig. 2) and a reciprocable connecting link 101 which is pivotally attached to and connects the upper end of the reach arm 93 with an upper arm 104 of bell crank lever 102. Bell crank lever 102 is pivotally supported on a stub shaft 103 carried by the plate 27, and by a laterally spaced bracket 106 (Fig. 1), the latter being attached to transverse frame member 13. The rear end of each picking unit 96 has a suspension bracket 107 mounting a stub shaft 109 which pivotally receives the lower arm 108 of bell crank lever 102. The relationship between the lower arm 108 of bell crank lever 102 and suspension link 92 (Fig. 2) is such that at all times they remain parallel due to the spacing provided by link 101 and, as a result, the unit 96 remains substantially parallel to the ground as it is raised or lowered.

The parallel linkage for guiding the picking unit 96 up and down in substantially parallel relation to the ground is duplicated at the right side of the machine for similarly guiding the picking unit 96'.

Referring to Figs. 1 and 2, the mentioned fluid motor or hydraulic ram 84 is supplied with pressure fluid by a hydraulic pump 112 supported on transmission housing 9 and operated by engine 2 through conventional means (not shown). A flexible pipe 113 hydraulically connects pump 112 to a three way valve 114 which is manually operable to selectively control the flow of fluid through a tube 116 connected with the ram 84 and with a basket elevating ram 117, respectively, the latter being pivotally carried by a bracket 118 attached to transverse tube 13. Operatively connected to three way valve 114 is a control element 119 which has an operating end carried by tube 22 adjacent the operator's station. Control element 119 can be actuated to direct pressure fluid from valve 114 either to ram 117 or to ram 84. Another control element 121 carried by tube 22 is connected to pump 112 and controls same for expanding or contracting the ram selected by valve 114 as desired or maintaining the selected ram in any desired position of adjustment. It is understood, of course, that the three way valve 114 must be properly positioned to establish a hydraulic connection with the ram desired to be raised, lowered or held in a selected position.

In operation, if it is desired to raise both cotton picking units 96 and 96' by power, pump control element 121 is adjusted to the raising position, and the three way valve 114 is moved to a position activating hydraulic ram 84. Hydraulic pump 112 then operates to extend ram 84 which in turn pivots lever structure 76 in a clockwise direction as viewed in Fig. 6. Pin 72 carried by arms 75 of lever structure 76 moves rearward and transmits lifting power through spring 73 and nuts 74 to link member 71 which moves to the right as seen in Fig. 3 and causes crank arm 67 to pivot rock shaft 66 and the roller arm 68 carrying roller 70 in clockwise direction. Roller 70 moves forward as seen in Fig. 3 in contact with the concave cam surface of cam shoe 94, and as a result, the suspension link 92 and cam shoe 94 will pivot as a unit in clockwise direction about the axis of support shaft 89. The forward end of link 92 is pivotally connected with the picking unit 96 through shaft 98 and sleeve 99, and the reach arm 93 of cam lever 92 is connected to the rear of the unit through connecting link 101 and bell crank 102. Consequently, when the link 92 and attached reach arm 93 are swung in clockwise direction, as stated, the rear of the unit is raised at the same time and at the same rate as the front end.

Hanger arms 97, 97' are attached to the picking unit 96 with the pivot shaft 98 approximately above the center of gravity of the picking unit. As a result, practically all of the weight of the picking unit 96 is lifted through the hanger structure 97, 100 and the rear support for the picking unit primarily serves to stabilize the unit against pivotal movement about the axis of shaft 98 and also to relieve the forward lifting connection including shafts 89 and 98 from torsional strains in a horizontal direction.

The foregoing explanations with respect to the lifting of the picking unit 96 at the left side of the machine similarly apply to the lifting of the picking unit 96' at the right side of the machine, it being understood that the picking unit 96' has a lifting connection with the multiple armed rocker structure 76 corresponding to that of the picking unit 96.

During the raising of the units 96, 96' the counterbalancing springs 69, which take up most of the weight of the units when the latter are in their lowered positions, continue to support substantially the same amount of weight for any adjusted position of the units. Referring to Fig. 3, the spring induced lifting torque about shaft 89 must be equal to the weight induced lowering torque about said shaft for all positions of the picking unit 96, in order for the unit to be perfectly counterbalanced. Practically, this condition of perfect balance is not desired and the counterbalancing means are in fact so arranged that they do not quite balance the units. The reason for this is that it is desirable that the units have sufficient unbalanced weight so that when the ram 84 is released to lower the units, the unbalanced weight of the individual units will provide enough force to overcome the frictional losses in the lifting and supporting mechanism and cause the units to descend under their own weight to the position regulated by the lifting mechanism or by the ground. As each unit is lifted or lowered, the weight of the unit remains constant but the horizontal spacing of the respective pivot shaft 98 from a vertical plane through the axis of shaft 89, that is, the effective lever arm about shaft 89 varies and, therefore, the weight induced lowering torque on cam lever 92 also varies. To substantially balance this varying torque, a counterbalance spring 69, crank arm 67, cam shoe 94, and roller 70 are provided for each unit. As either unit is raised or lowered the spring tension and the effective lever arm of crank arm 67 to which the spring is attached both vary but not at the same rate. In order to compensate for this difference in variation, roller arm 68 has been provided with the cam roller 70 which coacts with cam shoe 94, carried by cam lever 92. Cam shoe 94 is so designed in relation to the three previously mentioned variables that the spring induced lifting and the weight induced lowering torque about shaft 66 are always substantially equal for any vertically adjusted position of the picking unit.

Before picking operations start the units are customarily lowered until a sled runner, not shown, which is attached to the bottom of the unit, just contacts the ground. During operation, the unit will follow the contour of the ground since the coaction between the cam shoe 94, roller 70, roller arm 68, crank arm 67 and counterbalance spring 69 is such that the effective lifting force supplied to the unit through spring 69 is substantially constant for all positions of the unit. That is, it requires no more force to lift the unit the last two inches of its normal range of motion than it takes to lift the unit the first two inches of such range despite the fact that the spring has considerably more potential energy stored therein when the picking unit is in its lowest position.

This is accomplished automatically by the changes of effective lever arm length to which the crank arm 67, roller arm 68 and suspension link 92 are subjected, and by the change of radial distance of roller 70 from shaft 89, which occur when the picking unit is moved from any position of vertical adjustment to another. In other words, the lever ratios of the suspension system change automatically so as to compensate for the loss of lifting force incurred as the tension of the resilient biasing means or counterbalancing spring decreases due to the raising of unit 96. The counterbalancing spring 69 is attached through rod 105 to the upper end of crank arm 67 and tensioned to exert maximum lifting force on crank arm 67 when the latter is in a position of forward adjustment beyond that which affords its most effective lever arm length. The spring 69 exerts a progressively lesser force as crank arm 67 progressively pivots backward to its most effective lever arm position. Suspension link 92, roller arm 68 and cam shoe 94 are proportioned and arranged so that the torque arm of the lifting force, that is, the radial distance from shaft 89 to the contact point of roller 70 on cam shoe 94 increases as the tension of the counterbalance spring 69 decreases, the progressive increase of the radial distance of the roller contact point from shaft 89 and the incident increase of the lever arm at which the spring 69 acts upon the rock shaft 66 compensating for the progressive decrease of tension of the spring 69 as the unit is raised, thereby providing a balancing force for each picking unit which is the same or nearly the same for all adjusted positions of either unit.

As above mentioned, each picking unit 96 has a sled runner attached to the bottom plate of the picking unit and this runner contacts the ground when the unit is in its picking position. Each unit is mounted with its front end slightly higher than its rear end so that if an obstruction is met, the sled runner and unit will tend to rise and ride or float over the obstruction rather than to destructively dig into it. If either picking unit should strike an obstruction, the vertical component of the striking force coupled with the action of the counterbalancing mechanism results in a raising of the striking unit independently of the other unit. When either picking unit rises due to contact with an obstruction, the power transmitting linkage including attaching levers 83, sleeve 77, lever arms 75 and pivot pins 72 does not move at all due to the provision of the lost motion connections afforded by link members 71 and pivot pins 72. After the obstruction is passed, the picking unit returns to its former position as determined by the ram mechanism, and any shock incident to such return being cushioned by spring 73. Since the bulk of the weight of the picking unit is carried by the counterbalancing spring 69, the shock force is not of great moment and is readily dissipated by the compression of spring 73. Similarly, the buffer springs 73 dampen any shock incident to actuation of the ram 84 in implement raising direction.

It should be understood that it is not intended to limit the invention to the particular forms and details herein shown and described, and that the invention includes such other forms and modifications as are embraced by the scope of the appended claims.

It is claimed and desired to secure by Letters Patent:

1. A suspension system for agricultural implements comprising, in combination, a mobile support, an implement unit, means connecting said implement unit in guided vertically movable relation to said support, said means including a link member pivotally connected at one end with said implement unit, pivot means connecting said link at its other end with said support for swinging movement relative thereto about a fixed pivot center, an actuating rocker member pivotally mounted on said support on an axis in spaced relation to said fixed pivot center, a cam element rigidly connected with one of said members, a cam follower element connected with the other of said members and engageable with said cam element, and a counterbalancing spring operatively interposed between said actuating rocker and said support so as to bias said link for swinging movement about said fixed pivot center in implement raising direction.

2. A suspension system for agricultural implements comprising, in combination, a mobile support; an implement unit; means connecting said implement unit in guided vertically movable relation to said support including: a link member having a pivotal mounting on said support, a cam element rigidly connected with said link member for movement therewith relative to said support and presenting a concave cam surface in facing relation to said pivot mounting of said link, an actuating rocker mounted on said support for pivotal movement relative thereto on an axis in spaced relation to the pivot center of said link member, a cam follower element connected with said actuating rocker and engageable with said cam element, and power transmitting means operatively interposed between said support and said actuating rocker, said power transmitting means including a counterbalancing spring operatively connected at one of its ends with said actuating rocker and at its other end to said support for biasing said implement in a raising direction.

References Cited in the file of this patent

UNITED STATES PATENTS

| Number | Name | Date |
|---|---|---|
| 996,125 | Pagel | June 27, 1911 |
| 1,261,746 | Grob | Apr. 2, 1918 |
| 1,776,261 | Kreissig | Sept. 23, 1930 |
| 1,958,625 | Johnson | May 15, 1934 |
| 2,001,079 | Court | May 14, 1935 |
| 2,099,637 | Wendel | Nov. 16, 1937 |
| 2,151,270 | Hamill | Mar. 21, 1939 |
| 2,190,359 | Hipple | Feb. 13, 1940 |
| 2,315,632 | Martindill | Apr. 6, 1943 |
| 2,324,866 | Mott | July 20, 1943 |
| 2,372,403 | Swanson | Mar. 27, 1945 |
| 2,482,751 | Hartsock et al. | Sept. 27, 1949 |
| 2,569,389 | Seaholm | Sept. 25, 1951 |
| 2,626,554 | Silver et al. | Jan. 27, 1953 |
| 2,651,247 | Hartsock et al. | Sept. 8, 1953 |